(12) United States Patent
Neuman et al.

(10) Patent No.: US 7,752,371 B2
(45) Date of Patent: Jul. 6, 2010

(54) SYSTEM AND METHOD FOR INTERRUPT ABSTRACTION

(75) Inventors: Darren Neuman, Palo Alto, CA (US); Jason Herrick, Newark, CA (US); Patrick Law, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/025,491

(22) Filed: Dec. 29, 2004

(65) Prior Publication Data

US 2005/0144348 A1    Jun. 30, 2005

Related U.S. Application Data

(60) Provisional application No. 60/533,993, filed on Jan. 2, 2004, provisional application No. 60/532,959, filed on Dec. 29, 2003.

(51) Int. Cl.
*G06F 13/24* (2006.01)

(52) U.S. Cl. .................................. 710/266; 382/232
(58) Field of Classification Search ............. 710/48–50, 710/260, 262–264, 266–269; 382/232
See application file for complete search history.

(56) References Cited

U.S. PATENT DOCUMENTS

| | | | | |
|---|---|---|---|---|
| 4,604,500 A * | 8/1986 | Brown et al. | ............... | 379/269 |
| 4,626,987 A * | 12/1986 | Renninger | ................... | 710/262 |
| 4,760,516 A * | 7/1988 | Zwick | ......................... | 710/260 |
| 5,282,272 A * | 1/1994 | Guy et al. | ................... | 710/116 |
| 5,428,799 A * | 6/1995 | Woods et al. | ............... | 710/266 |
| 5,481,724 A * | 1/1996 | Heimsoth et al. | .......... | 709/229 |
| 5,559,999 A * | 9/1996 | Maturi et al. | ............... | 713/400 |
| 5,560,018 A * | 9/1996 | Macon et al. | ............... | 710/260 |
| 5,870,497 A * | 2/1999 | Galbi et al. | ................. | 382/232 |
| 5,892,956 A * | 4/1999 | Qureshi et al. | .............. | 710/260 |
| 5,905,913 A * | 5/1999 | Garrett et al. | ................. | 710/49 |
| 6,192,425 B1 * | 2/2001 | Sato | ........................... | 710/48 |
| 6,247,091 B1 * | 6/2001 | Lovett | ....................... | 710/260 |
| 6,266,732 B1 * | 7/2001 | Chen et al. | .................. | 710/263 |
| 6,477,600 B1 * | 11/2002 | Baxter et al. | ................ | 710/260 |
| 6,539,448 B1 * | 3/2003 | Deng | ......................... | 710/260 |
| 6,937,661 B2 * | 8/2005 | Narita | .................... | 375/240.26 |
| 6,988,155 B2 * | 1/2006 | Lary et al. | ................... | 710/260 |
| 7,188,337 B2 * | 3/2007 | Yoda | .......................... | 717/127 |
| 2005/0154801 A1 * | 7/2005 | Neuman et al. | ............... | 710/22 |

OTHER PUBLICATIONS

Definition of Interrupt, Wikipedia.*
Inter Architecture Software Developer's Manual, vol. 3: System Programming Guide, Intel, 1997.*

* cited by examiner

*Primary Examiner*—Khanh Dang
(74) *Attorney, Agent, or Firm*—McAndrews Held & Malloy, Ltd.

(57) ABSTRACT

A system and method that abstracts an interrupt from a group of interrupts, which may occur in a module, to call another module. Abstracting one interrupt from a group of interrupts allows the called module to deal with only one interrupt. The choice of the interrupt may be based on the configuration of the module from which the interrupts are originated. In an embodiment of the present invention, the abstracted interrupt triggers an event. When the triggered event is completed, an interrupt may be fired off to the target module. An interrupt handler in the target module or an external interrupt handler may handle the interrupt that calls the target module.

1 Claim, 3 Drawing Sheets

SYSTEM AND METHOD FOR INTERRUPT ABSTRACTION

RELATED APPLICATIONS

This patent application makes reference to, claims priority to and claims benefit from U.S. Provisional Patent Application Ser. No. 60/533,993, entitled "System and Method for Interrupt Abstraction," filed on Jan. 2, 2004, and U.S. Provisional Patent Application Ser. No. 60/532,959, entitled "MPEG Field Data-Driven Display," filed on Dec. 29, 2003.

The complete subject matter of the above-referenced United States Provisional Patent Applications is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In a system comprised of multiple modules, calls made from one module to another may depend on the occurrence of certain interrupts. In some systems, a module may be accessed by an interrupt, which may come from multiple sources. The problem when interrupts come form multiple sources is that the accessed module needs to handle only a single interrupt and ignore the others.

A first module may provide an interrupt, which may be handled by a second module. The first module may possibly fire the interrupt erroneously or at a time when the configuration does not want to provide an interrupt to the second module. In existing technology, the second module must be configured to handle and discard these interrupts, which may be difficult or impossible.

FIG. 1 illustrates a block diagram of an exemplary system in which a module may be accessed by an interrupt that may come from multiple sources. Module 103 may need to handle a single interrupt coming from module 101. Depending on the configuration of module 101, which may be one of configuration 105 and configuration 107, the interrupt may come from multiple sources. When one of the configurations 105 or 107 is active, the interrupt handier 109 of module 103 should ignore the interrupt from the other configuration.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a method that abstracts a first interrupt from a plurality of interrupts, to access a target module in system with a machine-readable storage having stored thereon, a computer program having at least one code section. The at least one code section being executable by a machine for causing the machine to perform steps comprising configuring the first interrupt to trigger a first event; triggering the first event; and creating a second interrupt to the target module; wherein the second interrupt is created upon completion of the first event.

The system comprises at least one processor capable of configuring the first interrupt to trigger a first event; the at least one processor capable of triggering the first event; and the at least one processor capable of creating a second interrupt to the target module.

The method comprises configuring the first interrupt to trigger a first event; triggering the first event; and creating a second interrupt to the target module.

In an embodiment of the present invention, a third module may handle the second interrupt. In another embodiment of the present invention, the target module may handler the second interrupt.

In an embodiment of the present invention, the plurality of interrupts may come from a plurality of source modules.

In an embodiment of the present invention, the plurality of interrupts may be caused by a plurality of errors.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention may be seen in a video system such as, for example, a Motion Picture Expert Group (MPEG) system with a MPEG field data-driven display. An example of a MPEG field data-driven display is described in U.S. patent application Ser. No. 11/025,327, entitled "MPEG Field Data-Driven Display," filed Dec. 29, 2004; the complete subject matter of which is hereby incorporated herein by reference, in its entirety. While the following discusses the invention in terms of MPEG video, aspects of the present invention may also be used with other video coding standards such as, for example, AVC/H.264 video.

Although the following discusses aspects of the invention in terms of a video system, it should be clear that the following discussion may also apply to other systems that utilizes interrupts between two portions of the system such as, for example, hardware and a host.

Figure 1:
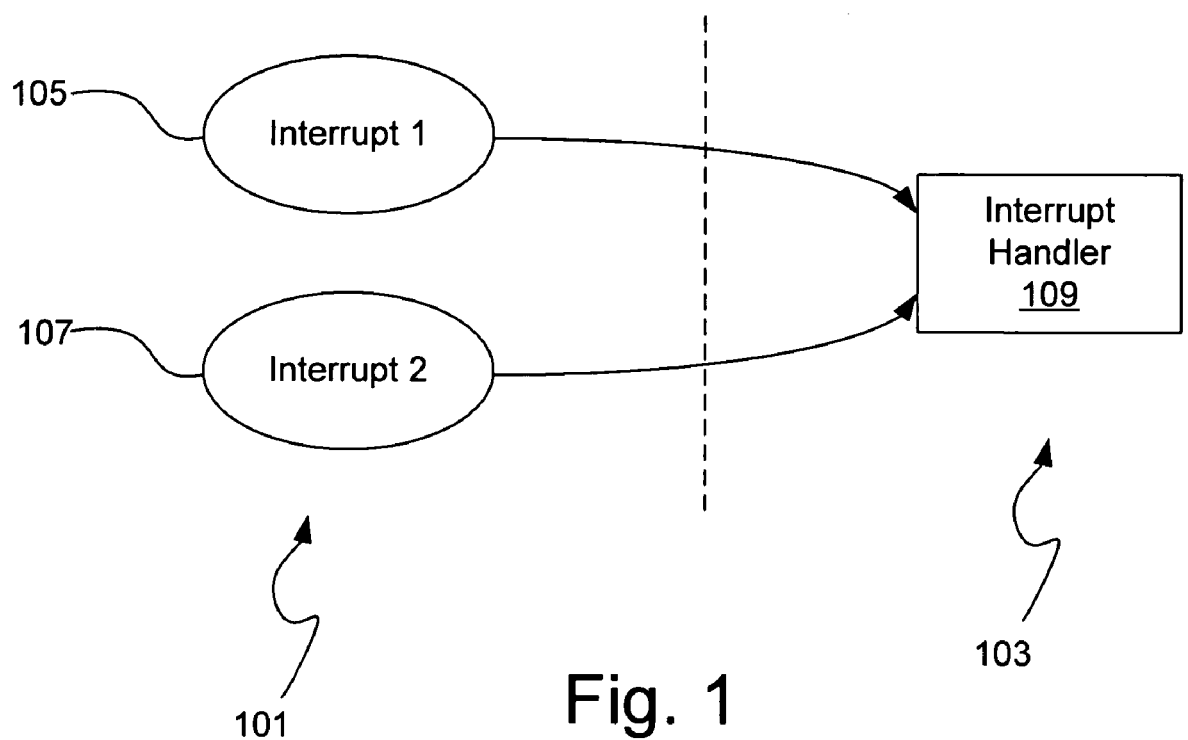
FIG. 1 illustrates a block diagram of an exemplary system in which a module may be accessed by an interrupt that may come from multiple sources, in accordance with an embodiment of the present invention.

In an embodiment of the present invention, the configuration of a module such as, for example, module 101 of FIG. 1 may be communicated to a module such as, for example, module 103, such that module 103 may connect to the correct interrupt and ignore the other.

In another embodiment of the present invention, a module such as, for example, module 101 of FIG. 1 may write an interrupt handler (not shown), which may then call an interrupt handler such as, for example, the interrupt handler 109 of module 103.

In yet another embodiment of the present invention, a module such as, for example, module 101 of FIG. 1 may write an interrupt handler, which may be configured to receive multiple interrupts 105 and 107 and fire off the appropriate interrupt to module 103.

In an embodiment of the present invention, a MPEG decoder may transmit a data structure containing properties for the display of every field one field prior to it being fed into a video display. The data structure may contain data that may describe the properties required to display the next field such as, for example, pan-scan, field polarity, aspect ratio, picture size, etc. The data associated with a certain field may be provided at one fixed point in time relative to the display time of the field. In an embodiment of the present invention, each data structure may contain all the data associated with a video field, regardless of whether the information has changed from the previously displayed field or not.

In a MPEG video decoder (MVD), data may be passed between the MVD and firmware on one end, and between the MVD and a video display control (VDC) on another end. In an embodiment of the present invention, the MVD and firmware may not be capable of passing data directly to the VDC; as a result, data may need to be passed through a high-level software (HLS) callback. The HLS callback may be registered with the MVD.

In an embodiment of the present invention, when called, the HLS callback may pass the data to the VDC. The firmware may pass the data through the MVD to get to the HLS callback. In an embodiment of the present invention, data structures may be used to pass data from the firmware to the MVD, the MVD to a HLS callback, and the HLS callback to the VDC. In an embodiment of the present invention, data may be given to a module to pass the data along such as, for example, data being sent by the firmware to the MVD, which may pass the data along to a HLS callback to pass the data along to the VDC.

Figure 2:
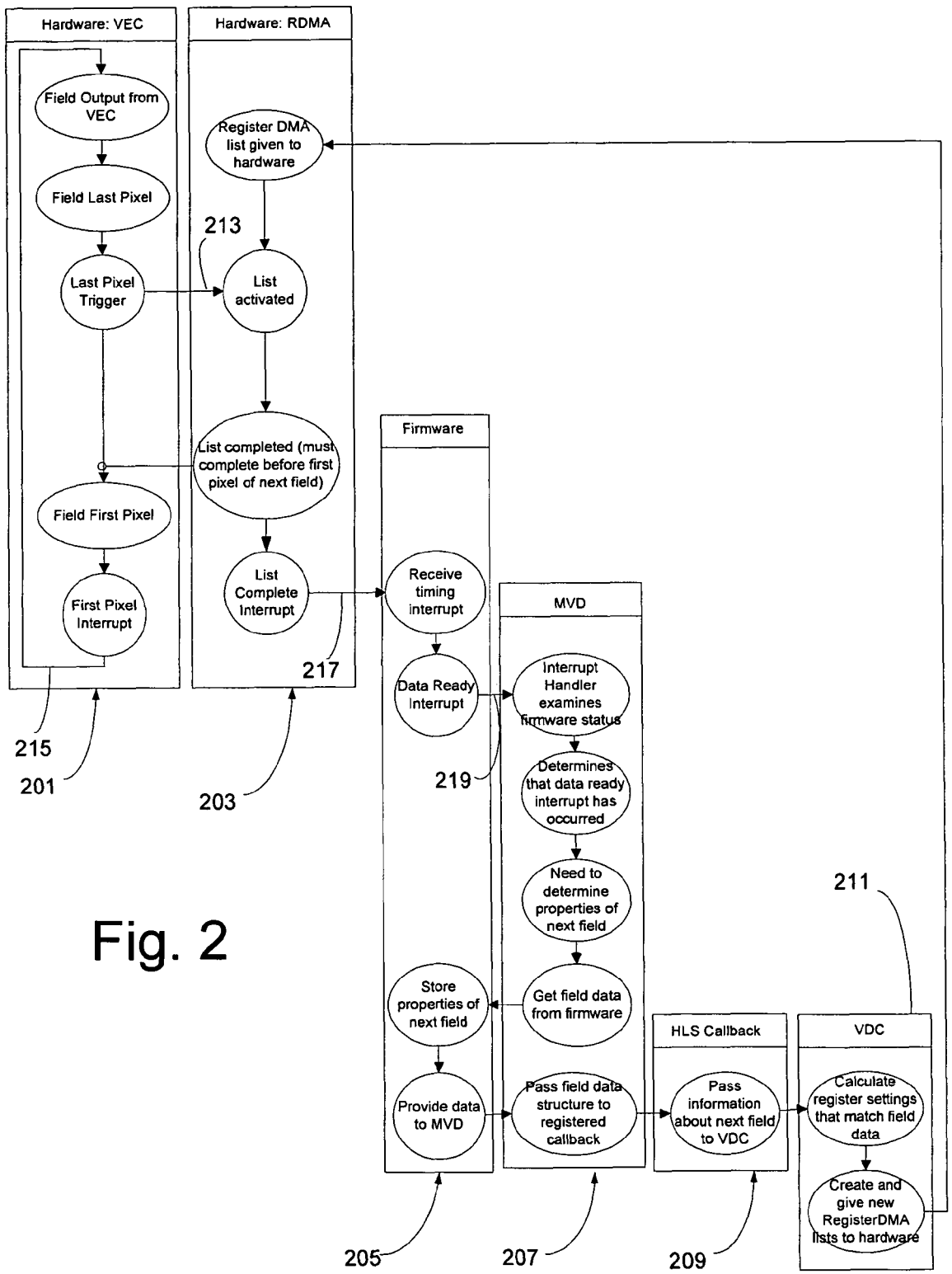
FIG. 2 illustrates a flow diagram of data flow in an exemplary system with a MPEG field data-driven display, in accordance with an embodiment of the present invention.

FIG. 2 illustrates a flow diagram of data flow in an exemplary system with a MPEG field data-driven display, in accordance with an embodiment of the present invention. The Hardware Video Encoder (VEC) section 201, may contain a repeating cycle through which the data in the system such as, for example, the pixels of a processed video field, may flow: Field Output→Field Last Pixel→Last Pixel Trigger → Field First Pixel→First Pixel Interrupt 215→and back to the Field Output.

In an embodiment of the present invention, the VEC 201 may drive an event, which may occur on the Last Pixel Trigger 213, upon which the Register Direct Memory Access (DMA) 203 list is activated. The Register DMA lists may contain commands utilized to drive the next field, so they are completed before the VEC reaches the Field First Pixel stage. When a Register DMA list is completed, the List Complete Interrupt 217 may occur, which may indicate that the VDC 211 may modify the Register DMA lists for the next field.

In an embodiment of the present invention, the firmware 205, when it has data to send to the host, and upon receiving the List Complete Interrupt 217, may signal so to the MVD 207 using the Data Ready Interrupt 219 to notify the host that data is ready to be processed. The MVD 207 may then process the Data Ready Interrupt 219, verify that the interrupt indeed means data is ready, query the firmware 205 for information about the field, and then pass this information about the field along to a HLS callback 209.

The HLS callback 209 may then pass the information to the VDC 211. The VDC 211 may, in turn, create the Register DMA lists for the next field and activate them. The Last Pixel Trigger 213 of the VEC 201 may then trigger the Register DMA lists, and the cycle may then repeat.

In an embodiment of the present invention, the firmware 205 may be driven by the interrupt 217, which may be generated by a register in the register DMA 203. The register DMA engine is programmable and may be driven by a multitude of sources, and as a result, the source of the interrupt driving the firmware 205 may change without requiring changes to the firmware 205. In another embodiment of the present invention, another source, which may or may not be within the register DMA 203, may drive the list complete interrupt 217, which may in turn drive the firmware 205. In such an embodiment, an independent module may be created to drive the interrupt that drives the firmware 205.

In an embodiment of the present invention, the system may comprise more than one VEC 201. Each one of the VECs 201 may send a triggering interrupt 213 to the Register DMA 203. Only one of the triggering interrupts 213 may be needed to trigger the interrupt 217 for the firmware 205 to ultimately drive the VDC 211.

In an embodiment of the present invention, a register DMA controller (RDC) may drive the list complete interrupt 217. The register DMA 203 may automate register writes using a register DMA engine (not shown). In an embodiment of the present invention, the register DMA 203 may be used to fire off another register DMA trigger, which may then fire off another register DMA list. Upon completion of a register DMA list, an interrupt 217 may occur.

In an embodiment of the present invention, the register DMA 203 may comprise a register update list (RUL), a DMA descriptor, and a DMA trigger. The RUL may be a 32-bit data structure and it may contain a list of operations such as, for example, the register writes. Multiple RULs may be created in advance by the host and stored in a memory. In an embodiment of the present invention, the RDC may convert the RUL into register updates. Upon completion of a RUL, an interrupt may be generated.

In an embodiment of the present invention, the DMA descriptor may reference a RUL. The DMA descriptor may be implemented as control registers inside a RDC with fields such as, for example, pointer, word count, etc., and it may be set up to execute a RUL. In an embodiment of the present invention, a RDC may support several DMA descriptors. A DMA descriptor may be programmed to associate with a RUL and a DMA trigger, which together may form a DMA channel.

In an embodiment of the present invention, the DMA trigger may be used to set off a register DMA operation. In an embodiment of the present invention, several DMA triggers may be connected to the RDC. A DMA trigger may come from an external signal such as, for example, an end-of-field signal from a video decoder, a vertical sync signal, etc. In an embodiment of the present invention, a DMA trigger may be bypassed and set off directly by writing to a trigger bit in a control register. The control register may be accessed by the multiple RULs created and stored in memory, such that an RUL may be able to fire off the trigger and activate another RUL. In an embodiment of the present invention, more than one RUL may be associated with a DMA trigger.

Figure 3:
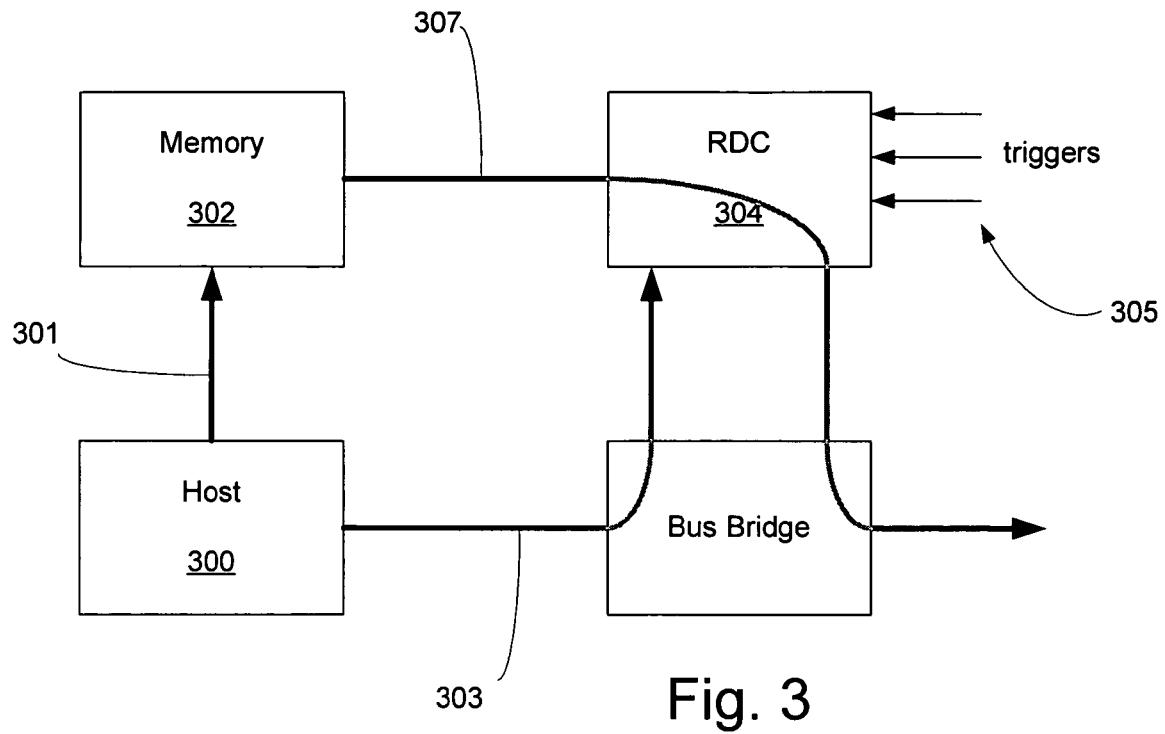
FIG. 3 illustrates a flow diagram of an exemplary register DMA operation, in accordance with an embodiment of the present invention.

FIG. 3 illustrates a flow diagram of an exemplary register DMA operation, in accordance with an embodiment of the present invention. The register DMA operation may comprise the host 300 creating a RUL in the memory 302, at 301; the host 300 setting up a DMA descriptor in the RDC 304, at 303;

an event setting off the DMA trigger 305; and finally the RDC 304 fetching the RUL from the memory 302 and executing it, at 307. In an embodiment of the present invention, the register DMA operation may be implemented in a pipelined manner.

Figure 4:
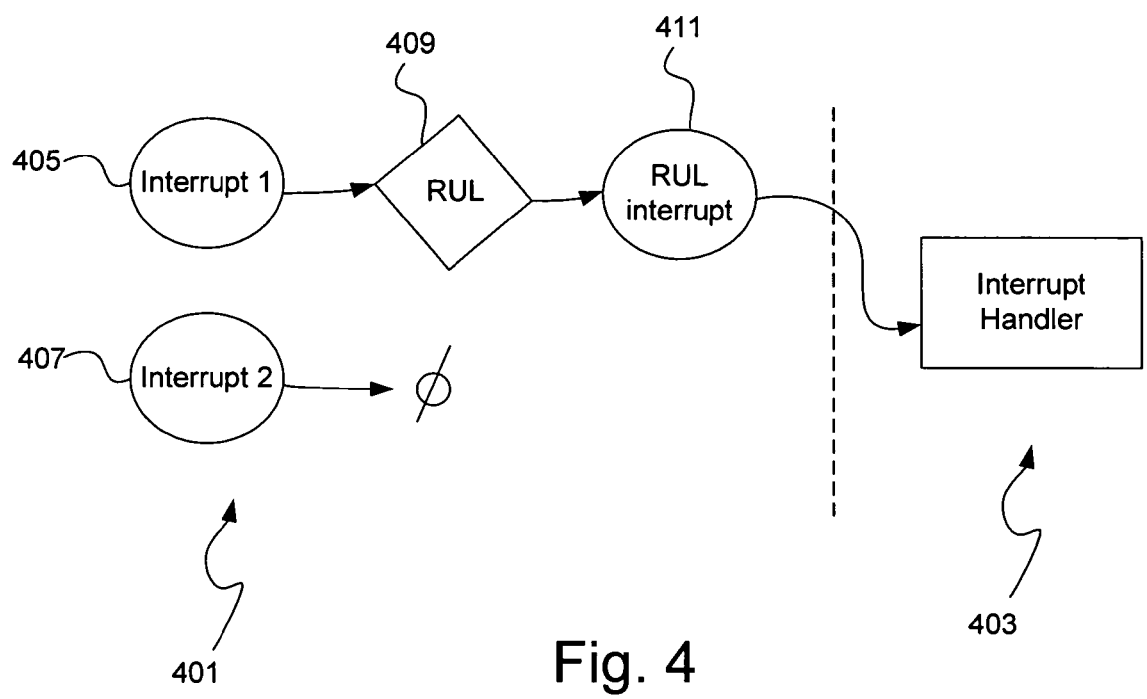
FIG. 4 illustrates a block diagram of an exemplary system in which a module may be accessed by an interrupt that may come from multiple sources, in accordance with an embodiment of the present invention.

FIG. 4 illustrates a block diagram of an exemplary system in which a module may be accessed by an interrupt that may come from multiple sources, in accordance with an embodiment of the present invention. The RDC may handle interrupts coming from several modules such as, for example, interrupts 213 from VECs 201 of FIG. 2, and fire off only one of those interrupts, which may then be treated like a trigger for a RUL such as, for example, the list activation by the interrupts 213. In an embodiment of the present invention, a module 401 may provide multiple interrupts 405 and 407, which may be, for example, interrupts 213 of FIG. 2. In an embodiment of the present invention, only one interrupt 405 may be needed to be passed. The one interrupt 405 may be configured such that it is treated like the trigger for the RUL 409. When the RUL 409 executes, the configured interrupt 406 may trigger the RUL 409, which in turn, may create an interrupt 411 such as, for example, interrupt 217 of FIG. 2, upon completion of the RUL 409. As a result, the second module 403 such as, for example, the firmware 205, which drives the VDC 211 of FIG. 2, may not need to receive any information regarding the configuration of the first module 401 such as, for example, the register DMA 203 of FIG. 2.

In an embodiment of the present invention, the provided interrupt may be handled by an external process/firmware. Additionally, the register DMA 203 may handle synchronization or time-based changes in the system based on occurrence of a trigger or an event such as, for example, an end-of-field signal from a video decoder.

In an embodiment of the present invention, one interrupt may drive multiple interrupts such as, for example, multiple firmwares 205. In such an embodiment, only the driving interrupt is active, depending on the configuration of the system, and as a result drives one of the multiple interrupts.

In another embodiment of the present invention, several interrupts may be needed to drive a single interrupt such as, for example, a system with an error handler where the source of the error may come from multiple interrupts and drive one interrupt handler. In such an embodiment, all the driving interrupts may be active, which may indicate that the configuration of the system may not restrict which of the interrupts is active.

In an embodiment of the present invention, a first module may provide an interrupt, which may be handled by a second module. The first module may possibly fire the interrupt erroneously or at a time when the configuration does not want to provide an interrupt to the second module. In an embodiment of the present invention, the source interrupt may be intercepted and a decision may be made to drop the interrupt and not provide it to the second module at all. Referring to FIG. 2, the first module may be, for example, the VEC 201, which may cause an additional spurious trigger 213. The erroneous trigger 213 may then be intercepted before it gets to the second module, for example, the register DMA 203. In such an embodiment, such interception may stop the trigger 217 from erroneously occurring.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of interrupting a target module, the method comprising:
    triggering the first event, wherein the triggering comprises encountering a last pixel in a field, and wherein the first event comprises executing instructions stored in a register DMA;
    originating an interrupt
    wherein the interrupt is originated as a result of completion of the instructions stored in the register DMA; and
    wherein the interrupt causes programming of the register DMA.

* * * * *